United States Patent
Bickley et al.

(10) Patent No.: US 7,054,704 B2
(45) Date of Patent: *May 30, 2006

(54) METHOD, SYSTEM AND FACILITY FOR CONTROLLING RESOURCE ALLOCATION WITHIN A MANUFACTURING ENVIRONMENT

(75) Inventors: Branden Clark Bickley, Austin, TX (US); Mark Allen Pape, Austin, TX (US); Richard M. Williams, Austin, TX (US); Nicholas J. Widis, Round Rock, TX (US); Brian J. Hunt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/177,061

(22) Filed: Jul. 8, 2005

(65) Prior Publication Data

US 2005/0246042 A1    Nov. 3, 2005

Related U.S. Application Data

(63) Continuation of application No. 10/617,306, filed on Jul. 10, 2003, which is a continuation of application No. 09/800,046, filed on Mar. 5, 2001, now Pat. No. 6,615,092.

(51) Int. Cl.
*G06F 19/00* (2006.01)
(52) U.S. Cl. .................... 700/100; 700/121; 705/18
(58) Field of Classification Search ................ 700/95, 700/108, 121, 99–102
See application file for complete search history.

(56) References Cited

U.S. PATENT DOCUMENTS

| | | | |
|---|---|---|---|
| 3,792,785 A | 2/1974 | Weir | 214/16.4 A |
| 3,796,327 A | 3/1974 | Meyer et al. | 214/38 BB |
| 4,310,276 A | 1/1982 | Castagnoli | 414/134 |
| 4,336,589 A | 6/1982 | Smith et al. | 364/403 |
| 4,473,935 A | 10/1984 | Tatsuura et al. | 29/429 |
| 4,501,528 A | 2/1985 | Knapp | 414/112 |

(Continued)

FOREIGN PATENT DOCUMENTS

EP        0 308 248        3/1989

(Continued)

OTHER PUBLICATIONS

Tom Feare *Less Automation Means More Productivity at Sun Microsystems* Modern Materials Handling at pp. 39-41. Nov. 1995.

(Continued)

*Primary Examiner*—Kidest Bahta
(74) *Attorney, Agent, or Firm*—Baker Botts L.L.P.

(57) ABSTRACT

A method and system provide for the control of resource allocation within a build-to-order manufacturing environment. One example embodiment of a method according to the present disclosure includes an operation for monitoring a work-in-process (WIP) profile that represents dynamic attributes of an area in a manufacturing facility. A user interface in a control center for the manufacturing facility may be automatically updated to depict one or more of the dynamic attributes in substantially real time, based on one or more of the WIP profiles. After the user interface is updated, user input that specifies a desired reallocation of resources for the manufacturing facility may be received. The user input may trigger communications with one or more areas in the manufacturing facility to implement the desired reallocation of resources. Alternative embodiments may include additional or alternative features, such as features for error detection and recovery.

20 Claims, 6 Drawing Sheets

U.S. PATENT DOCUMENTS

| | | | |
|---|---|---|---|
| 4,509,123 A | 4/1985 | Vereen | 364/200 |
| 4,544,318 A | 10/1985 | Nagatomo et al. | 414/222 |
| 4,553,893 A | 11/1985 | Kaschner et al. | 414/152 |
| 4,566,595 A | 1/1986 | Fustier | 209/545 |
| 4,669,047 A | 5/1987 | Chucta | 364/468 |
| 4,692,876 A | 9/1987 | Tenma et al. | 364/513 |
| 4,703,558 A | 11/1987 | Makinen | 29/784 |
| 4,711,016 A | 12/1987 | Genschow et al. | 29/568 |
| 4,722,653 A | 2/1988 | Williams et al. | 414/222 |
| 4,738,387 A | 4/1988 | Jaufmann et al. | 228/4.1 |
| 4,798,290 A | 1/1989 | Bradford | 206/328 |
| 4,815,190 A | 3/1989 | Haba, Jr. et al. | 29/430 |
| 4,821,197 A | 4/1989 | Kenik et al. | 364/468 |
| 4,823,233 A | 4/1989 | Brown et al. | 361/383 |
| 4,866,628 A | 9/1989 | Natarajan | 364/468 |
| 4,894,908 A | 1/1990 | Haba, Jr. et al. | 29/711 |
| 4,966,280 A | 10/1990 | Bradford | 206/328 |
| 5,017,260 A | 5/1991 | Bardford | 156/308.2 |
| 5,019,963 A | 5/1991 | Alderson et al. | 364/200 |
| 5,037,027 A | 8/1991 | Nichols | 229/198.1 |
| 5,038,283 A | 8/1991 | Caveney | 235/385 |
| 5,099,431 A | 3/1992 | Natarajan | 364/468 |
| 5,131,212 A | 7/1992 | Grey et al. | 53/472 |
| 5,144,532 A | 9/1992 | Wessely et al. | 361/385 |
| 5,146,732 A | 9/1992 | Grey et al. | 53/472 |
| 5,155,847 A | 10/1992 | Kirouac et al. | 395/600 |
| 5,175,692 A | 12/1992 | Mazouz et al. | 364/478 |
| 5,193,065 A | 3/1993 | Guerindon et al. | 364/468 |
| 5,205,406 A | 4/1993 | Bradford | 206/328 |
| 5,216,593 A | 6/1993 | Dietrich et al. | 364/402 |
| 5,216,613 A | 6/1993 | Head, III | 369/275.2 |
| 5,218,510 A | 6/1993 | Bradford | 361/220 |
| 5,229,948 A | 7/1993 | Wei et al. | 364/468 |
| 5,241,482 A | 8/1993 | Lida et al. | 700/110 |
| 5,247,683 A | 9/1993 | Holmes et al. | 395/700 |
| 5,247,747 A | 9/1993 | Grey et al. | 53/472 |
| 5,255,181 A | 10/1993 | Chapman et al. | 364/401 |
| 5,255,197 A | 10/1993 | Iida | 364/468 |
| 5,262,954 A | 11/1993 | Fujino et al. | 364/468 |
| 5,271,703 A | 12/1993 | Lindqvist et al. | 414/273 |
| 5,321,605 A | 6/1994 | Chapman et al. | 364/402 |
| 5,327,354 A | 7/1994 | Tsujimoto | 364/478 |
| 5,344,024 A | 9/1994 | Cohu | 206/526 |
| 5,353,243 A | 10/1994 | Read et al. | 364/578 |
| 5,367,624 A | 11/1994 | Cooper | 345/734 |
| 5,371,679 A | 12/1994 | Abe et al. | 364/468 |
| 5,386,621 A | 2/1995 | Flueggc et al. | 29/705 |
| 5,398,336 A | 3/1995 | Tantry et al. | 707/103 |
| 5,411,151 A | 5/1995 | Sasada | 209/583 |
| 5,450,317 A | 9/1995 | Lu et al. | 364/402 |
| 5,456,061 A | 10/1995 | Grey et al. | 53/472 |
| 5,469,691 A | 11/1995 | Grey et al. | 53/472 |
| 5,485,369 A | 1/1996 | Nicholls et al. | 364/401 |
| 5,513,427 A | 5/1996 | Yokoyama et al. | 29/701 |
| 5,522,539 A | 6/1996 | Bazany | 229/199 |
| 5,540,536 A | 7/1996 | Hoedl | 414/417 |
| 5,542,237 A | 8/1996 | Grey et al. | 53/472 |
| 5,579,231 A | 11/1996 | Sudou et al. | 364/468.01 |
| 5,586,021 A | 12/1996 | Fargher et al. | 364/468.06 |
| 5,590,794 A | 1/1997 | Zachary | 209/702 |
| 5,593,269 A | 1/1997 | Bernard, II | 414/331 |
| 5,596,502 A | 1/1997 | Koski et al. | 364/468.01 |
| 5,597,113 A | 1/1997 | Bradford | 229/120.36 |
| 5,608,621 A | 3/1997 | Caveney et al. | 395/216 |
| 5,613,606 A | 3/1997 | Meyer | 206/449 |
| 5,613,610 A | 3/1997 | Bradford | 206/721 |
| 5,630,070 A | 5/1997 | Dietrich et al. | 395/208 |
| 5,653,351 A | 8/1997 | Grout et al. | 212/315 |
| 5,666,493 A | 9/1997 | Wojcik et al. | 705/26 |
| 5,672,039 A | 9/1997 | Perry et al. | 414/280 |
| 5,712,989 A | 1/1998 | Johnson et al. | 395/228 |
| 5,720,157 A | 2/1998 | Ross | 53/154 |
| 5,748,478 A | 5/1998 | Pan et al. | 700/99 |
| 5,751,580 A * | 5/1998 | Chi | 700/101 |
| 5,758,329 A | 5/1998 | Wojcik et al. | 705/28 |
| 5,768,133 A | 6/1998 | Chen et al. | 364/468.01 |
| 5,787,283 A | 7/1998 | Chin et al. | 395/701 |
| 5,822,216 A | 10/1998 | Satchell, Jr. et al. | 364/479.01 |
| 5,826,238 A | 10/1998 | Chen et al. | 705/8 |
| 5,867,714 A | 2/1999 | Todd et al. | 395/712 |
| 5,869,820 A | 2/1999 | Chen et al. | 235/376 |
| 5,873,449 A | 2/1999 | Davenport | 198/370.09 |
| 5,880,960 A * | 3/1999 | Lin et al. | 700/99 |
| 5,894,571 A | 4/1999 | O'Connor | 395/652 |
| 5,896,292 A | 4/1999 | Hosaka et al. | 364/468 |
| 5,903,457 A | 5/1999 | Chang | 364/468.01 |
| 5,916,508 A | 6/1999 | Bradford | 264/263 |
| 5,919,247 A | 7/1999 | Van Hoff et al. | 709/217 |
| 5,936,860 A | 8/1999 | Arnold et al. | 364/468.01 |
| 5,937,388 A | 8/1999 | Davis et al. | 705/8 |
| 5,943,841 A | 8/1999 | Wunscher | 414/268 |
| 5,963,743 A | 10/1999 | Amberg et al. | 395/712 |
| 5,966,694 A | 10/1999 | Rothschild et al. | 704/7 |
| 5,971,587 A | 10/1999 | Kato et al. | 364/468.22 |
| 5,974,547 A | 10/1999 | Klimenko | 713/2 |
| 5,991,543 A | 11/1999 | Amberg et al. | 395/712 |
| 5,991,732 A | 11/1999 | Moslares | 705/8 |
| 5,995,757 A | 11/1999 | Amberg et al. | 395/712 |
| 6,038,486 A | 3/2000 | Saitoh et al. | 700/96 |
| 6,039,168 A | 3/2000 | Head, III | 198/341.07 |
| 6,052,684 A | 4/2000 | Du | 707/8 |
| 6,076,652 A | 6/2000 | Head, III | 198/341.07 |
| 6,080,207 A | 6/2000 | Kroening et al. | 717/11 |
| 6,109,444 A | 8/2000 | Bagwell et al. | 206/589 |
| 6,128,588 A | 10/2000 | Chacon | 703/6 |
| 6,139,240 A | 10/2000 | Ando | 414/267 |
| 6,141,647 A | 10/2000 | Meijer et al. | 705/1 |
| 6,144,945 A | 11/2000 | Garg et al. | 705/28 |
| 6,148,291 A | 11/2000 | Radican | 705/22 |
| 6,170,630 B1 | 1/2001 | Goss et al. | 193/35 |
| 6,182,275 B1 | 1/2001 | Beelitz et al. | 717/1 |
| 6,202,070 B1 | 3/2001 | Nguyen et al. | 707/104 |
| 6,202,824 B1 | 3/2001 | Goss et al. | 198/346.2 |
| 6,205,473 B1 | 3/2001 | Thomasson et al. | 709/217 |
| 6,236,901 B1 | 5/2001 | Goss | 700/95 |
| 6,247,126 B1 | 6/2001 | Beelitz et al. | 713/1 |
| 6,263,253 B1 | 7/2001 | Yang et al. | 30/169 |
| 6,285,967 B1 | 9/2001 | Rajan et al. | 702/188 |
| 6,308,496 B1 | 10/2001 | Lee et al. | 53/154 |
| 6,314,337 B1 | 11/2001 | Marcum | 700/216 |
| 6,336,053 B1 | 1/2002 | Beatty | 700/108 |
| 6,377,561 B1 | 4/2002 | Black et al. | 370/330 |
| 6,397,385 B1 | 5/2002 | Kravitz | 717/173 |
| 6,442,683 B1 | 8/2002 | Fleming, III | 713/1 |
| 6,446,680 B1 | 9/2002 | Soehnlen et al. | 141/9 |
| 6,450,751 B1 | 9/2002 | Hollander | 414/268 |
| 6,499,115 B1 | 12/2002 | Wiedeman et al. | 714/30 |
| 6,505,093 B1 | 1/2003 | Thatcher et al. | 700/216 |
| 6,507,765 B1 * | 1/2003 | Hopkins et al. | 700/95 |
| 6,516,242 B1 | 2/2003 | Brown | 700/216 |
| 6,523,045 B1 | 2/2003 | Beatty | 707/102 |
| 6,543,047 B1 | 4/2003 | Vrhel, Jr. et al. | 717/121 |
| 6,591,153 B1 | 7/2003 | Crampton et al. | 700/100 |
| 6,598,223 B1 | 7/2003 | Vrhel, Jr. et al. | 717/174 |
| 6,611,727 B1 | 8/2003 | Bickley et al. | 700/99 |
| 6,615,092 B1 | 9/2003 | Bickley et al. | 700/99 |
| 6,651,093 B1 | 11/2003 | Wiedeman et al. | 709/221 |
| 6,654,347 B1 | 11/2003 | Wiedeman et al. | 370/241 |
| 6,711,798 B1 | 3/2004 | Sanders et al. | 29/407.01 |
| 6,760,708 B1 | 7/2004 | Hubbard et al. | 705/27 |
| 6,816,746 B1 | 11/2004 | Bickley et al. | 700/99 |
| 6,892,104 B1 | 5/2005 | Patil et al. | 700/95 |

| | | | |
|---|---|---|---|
| 6,920,427 B1 | 7/2005 | Anthony et al. | 705/22 |
| 2001/0027350 A1 | 10/2001 | Koga et al. | 700/95 |
| 2002/0062169 A1 | 5/2002 | Kondo et al. | 700/216 |
| 2002/0128810 A1 | 9/2002 | Craig et al. | 703/17 |
| 2002/0156663 A1 | 10/2002 | Weber et al. | 705/7 |
| 2004/0073333 A1 | 4/2004 | Brill | 700/224 |

FOREIGN PATENT DOCUMENTS

| | | |
|---|---|---|
| EP | 0 606 515 A2 | 3/1993 |
| JP | 61094930 | 5/1986 |
| JP | 61155128 | 7/1986 |
| JP | 3005894 | 1/1991 |
| JP | 6013449 | 1/1994 |
| JP | 6345269 | 12/1994 |
| JP | 7110834 | 4/1995 |
| JP | 8147568 | 6/1996 |
| JP | 8295409 | 11/1996 |
| JP | 11306233 | 11/1999 |
| JP | 11310312 | 11/1999 |

OTHER PUBLICATIONS

McHugh Software International, McHugh Software International Makes the *"Glass Pipeline" a Reality, New Global Visibility Product is Cornerstone of Supply Chain Command & Control*, at internet <http://www.mchugh.com/In_The_News/Oct19_00.htm>, Oct. 19, 2000.

McHugh Software International, *McHugh's Logistics Execution Solution for High Tech/Electronic Companies*, at internet <http://www.mchugh.com/industry/hitech_elec.htm>, Jan. 25, 2001.

* cited by examiner

METHOD, SYSTEM AND FACILITY FOR CONTROLLING RESOURCE ALLOCATION WITHIN A MANUFACTURING ENVIRONMENT

CROSS REFERENCE TO RELATED APPLICATIONS

This application is a continuation of U.S. patent application Ser. No. 10/617,306 filed Jul. 10, 2003 entitled Method, System and Facility for Controlling Resource Allocation within a Manufacturing Environment filed by Branden Clark Bickley, et al.; which is a continuation of U.S. patent application Ser. No. 09/800,046 filed Mar. 5, 2001, now U.S. Pat. No. 6,615,092, entitled Method, System and Facility for Controlling Resource Allocation within a Manufacturing Environment filed by Branden Clark Bickley et al.

TECHNICAL FIELD

The present disclosure generally relates to manufacturing and, more particularly to a method, system and facility for controlling resource allocation within a manufacturing environment.

BACKGROUND OF THE DISCLOSURE

Many years ago, manufacturers learned that, when building sufficiently large quantities of identical products, assembly lines could be used to increase the rate of production and decrease the per-unit production costs. In an assembly line, the assembly process is divided in a series of processing steps through which the work-in-process moves to result in the end product. These steps may be optimized, and once the manufacturing system becomes operational it will build a number of products with the same configuration using the optimized steps.

Assembly lines are typically used in a build-to-stock production model, where large quantities of identical products are manufactured in anticipation of forecasted demand. The manufactured products are then warehoused until that demand is realized. Build-to-stock manufacturing systems are therefore primarily suited to markets in which manufacturers can accurately predict customer demand.

In many markets, however, predicting customer demand is risky, at best. For example, in the market for computer systems and related items, technological improvements are realized so frequently and component prices change so rapidly that it is difficult to accurately predict how large the market for any particular product will ultimately be. As a result, when manufacturers in industries like information technology utilize the build-to-stock model, those manufacturers frequently find themselves with stocks of manufactured goods that are difficult or impossible to market at a profit (i.e., with stale inventory).

A contrasting model of production that helps manufacturers avoid the stale-inventory problem is the build-to-order model. According to the build-to-order model, each product is assembled only after a customer has ordered that particular product. One of the disadvantages traditionally associated with the build-to-order model, however, is that more time is required to fill orders, in that products must be manufactured, not simply taken from stock. Another disadvantage is that build-to-order manufacturing systems are typically less efficient than build-to-stock manufacturing systems, which drives up the cost of products that are built to order. Accordingly, build-to-order systems have typically been utilized in markets for luxury items, such as tailored clothing, and markets in which a paucity of manufacturers leaves consumers with little choice but to bear the high prices and delays that are generally passed down by build-to-order manufacturers.

Some manufacturers have attempted to minimize the delays associated with the build-to-order model by maintaining a significant inventory of the materials required for production (e.g., the components that are assembled to create the finished goods). Simply carrying such an inventory, however, imposes costs on manufacturers, including the costs associated with warehousing the material. Furthermore, in markets where product innovations occur rapidly, such material oftentimes become stale.

For example, in contemporary times, the market for computer systems (including, without limitation, mini-computers, mainframe computers, personal computers, servers, work stations, portables, hand held systems, and other data processing systems) has been marked by high and increasing rates of product innovation. Further, to manufacture, for example, a typical personal computer, many different components are required, including a processor, memory, additional data storage (such as a hard disk drive), a number of peripheral devices that provide input and output (I/O) for the system, and adapter cards (such as video or sound cards) for communicating with the peripheral devices. Each of those components is also typically available in many different variations. In such markets, even if using the build-to-order model, manufacturers risk significant losses when carrying significant inventories of material.

Also, it is difficult to optimize build-to-order manufacturing facilities in terms of labor requirements and space requirements, as such facilities must be able to produce of a wide variety of products. However, in markets where many manufacturers are competing for customers, such as the computer system market, any reduction in production costs that does not decrease product quality is an important improvement.

Among the cost-saving measures that a producer may employ is to follow the direct-ship model, in which the manufacturer avoids middlemen such as distributors and retailers by accepting orders directly from and shipping products directly to customers. However, additional costs are borne by a manufacturer that provides a direct-ship option, in that the manufacturer must provide distribution facilities, in addition to providing the manufacturing facilities.

SUMMARY OF THE DISCLOSURE

In accordance with teachings of the present disclosure, a method, system and facility are described for controlling resource allocation within a manufacturing environment. According to one aspect, a manufacturing facility employing dynamic allocation of resources for assembling and shipping computer based systems is disclosed. The facility includes a centralized information system communicatively coupled with selective portions of the manufacturing facility and operable to aggregate information associated with manufacturing computer systems. The facility further includes a work in process (WIP) profile associated with the selective portions of the facility and operable to provide information in substantially real-time to the centralized information system. The facility further includes at least one user interface displayed within a control center of the manufacturing facility and operable to enable allocation of resources within the selective portions of the manufacturing facility.

According to another aspect of the present disclosure, a system for providing a control center for a manufacturing facility is disclosed. The system includes a plurality of information sources operably associated with manufacturing products within the manufacturing facility. A user interface of the system displays selective information associated with portions of the manufacturing facility within a control center operable to manage production within the manufacturing facility. The system further includes a resource allocator operably coupled to the control center and the plurality of information sources and the resource allocator is operable to monitor work in process within the manufacturing facility.

According to a further aspect of the present disclosure, a method for controlling allocation of resources within a manufacturing facility is disclosed. The method includes determining a WIP profile associated with one or more areas within the manufacturing facility and accessing one or more databases to provide an aggregated information source to be displayed within a user interface of a control center. The method further includes determining available capacity based on shipping and scheduling information for the manufacturing facility and identifying an order release criteria limiting shipment of an order, the limiting associated with the WIP profile.

The present disclosure relates to a manufacturing facility that provides build-to-order products and direct shipment of products to customers. More specifically, the present disclosure relates to a manufacturing facility that is constructed and operated in such a manner as to enjoy numerous benefits, relative to prior art manufacturing facilities, including the benefit of reduced production costs. In addition, the present disclosure relates to systems and methods that may be utilized to advantage in a distribution facility, independent of the manufacturing process.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE DISCLOSURE

Preferred embodiments and their advantages are best understood by reference to FIGS. 1 through 6, wherein like numbers are used to indicate like and corresponding parts.

Figure 1:
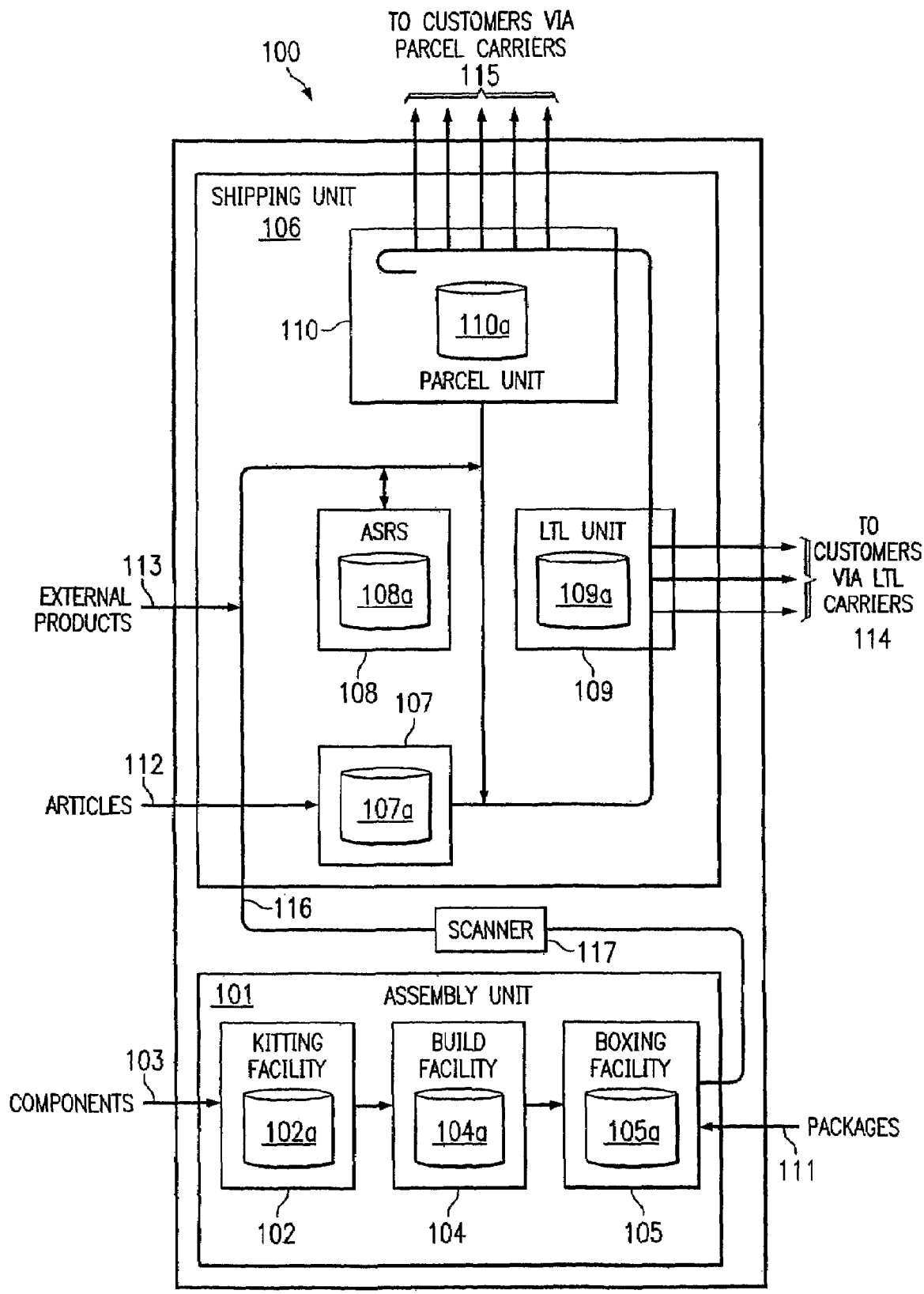
FIG. 1 illustrates a manufacturing facility in accordance with teachings of the present disclosure.

Referring to FIG. 1, there is depicted an exemplary manufacturing facility 100 according to the present disclosure. In the illustrative embodiment, manufacturing facility 100 is used to manufacture computers, which are shipped directly to customers, along with associated articles (such as monitors, speakers, printers, etc). Manufacturing facility 100 is operated according to a new process and includes significant architectural enhancements, new hardware, and new control logic that provides increased quality and efficiency.

During production, the manufacturer receives one or more customer orders from a business unit and orders components from suppliers needed to manufacture the products for those orders and articles and packaging (such as boxes and protective inserts) needed to fill the orders. Preferably, to minimize the inventory carried in manufacturing facility 100, few if any components, articles, and packaging will be left over from previous production runs. Therefore, at the beginning of each production run, most or all of components 103, articles 112, and packages 111 for the orders in that run will be ordered from suppliers. Production runs may nevertheless overlap to some degree, in that the manufacturer need not wait until the last item for one run is shipped before ordering components for the next production run from suppliers.

Manufacturing facility 100 receives ordered components 103, articles 112, and packages 111 via assembly unit 101 in one region and a shipping unit 106 in another region (illustrated near the upper end of FIG. 1). Product components 103 are received in assembly unit 101 via docks in a first portion of the left wall of manufacturing facility 100. By contrast, packages 111 for assembled products enter assembly unit 101 through the lower portion of the right wall of manufacturing facility 100.

Manufacturing facility 100 may also receive products (e.g., computers) that were assembled at other facilities and delivered to manufacturing facility 100 to fill an order. Preferably, external products 113 are received into shipping unit 106, via docks in the second portion of left wall of left of manufacturing facility 100 as are ordered articles 112. Preferably, however, the receiving docks (not expressly shown) for ordered articles 112 are disposed between the docks for external products 113 and the docks for components 103, and articles 112 are temporarily stored in an article-staging area 107 at the lower edge of shipping unit 106 near assembly unit 101.

Once sufficient components 103 have been received, assembly unit 101 begins assembling components 103 into computers systems. Specifically, components 103 are kitted in a kitting facility 102, and the component kits are transported to a build facility 104 for assembly and configuration. Once assembled and configured, each product such as a computer system is transported to a boxing facility 105, where the product is packaged and a tracking label is applied to the packaged product. The finished products are then transported to shipping unit 106 via transport 116.

As illustrated in FIG. 1, each area within manufacturing facility 100 includes a Work-in-Process ("WIP") profile for identifying the volume and throughput of product within a specific area of manufacturing facility 100. For example, kitting facility 102 includes an associated kitting WIP profile 102a; build facility 104 includes an associated build facility WIP profile 104a; boxing or packaging facility 105 includes an associated boxing or packaging facility WIP profile 105a. In a similar manner, each area within shipping unit 106 includes associated WIP profiles. Manufacturing facility 100 further includes associated monitoring and control hardware and software for accessing, controlling and communicating WIP profiles within each area of manufacturing facility 100. For example, as product or units transported throughout manufacturing facility 100, each unit may be scanned into and out of each area using an optical scanner and bar code to identify when product enters and/or leaves an area within manufacturing facility 100. A WIP profile for each area and associated logs, databases, etc. may be automatically updated for specific units as they progress through manufacturing facility 100. In this manner, a control center (not expressly shown) may employ one or more software programs to access WIP profiles for aggregating information related to manufacturing thereby allowing effecting management of resources within manufacturing facility 100.

For example, shipping unit 106 utilizes a shipping system (i.e., the equipment in shipping unit 106 and the related software) which receives each finished product from the assembly unit (as well as external products) and automatically determines whether the corresponding order is fillable (i.e., whether all items in the order, including products and associated articles, are available for shipping). The shipping system also automatically determines whether each fillable order is shippable (i.e., whether there is a suitable carrier vehicle or shipping container present with available capacity to receive the items in the order). These automatic determination are made with reference to databases including WIP profiles that reflect the current state of the production environment. A control center may access the database or databases to identify which products are ready for shipment, which articles have been received, which carrier vehicles are present, and how much capacity those vehicles have available.

In the illustrative embodiment, shipping unit 106 includes a receiving scanner 117, which monitors a transport 116 that brings products from assembly unit 101 into shipping unit 106. As each product passes by receiving scanner 117, receiving scanner 117 reads a barcode on that product's tracking label, updates one or more databases to reflect the detected location of the scanned product, and triggers the automatic process for determining whether to release an order (i.e., whether to transport the items in the order to outgoing docks).

If the shipping system determines that an order is not fillable or not shippable, the shipping system automatically stores the products received for that order in automated storage and retrieval system (ASRS) 108. When it is determined that an order is fillable and shippable, the shipping system automatically updates the status of the order in one or more databases to flag the order as having been released and automatically conveys the ordered items to a parcel unit 110 for tendering to parcel carriers (for small orders) or to a less-than-trailer-load (LTL) unit 109 to be loaded onto pallets and then tendered to LTL carriers (for larger orders), as described in greater detail below.

As illustrated, products flow out of the LTL unit 109 through docks in an upper portion of right wall of manufacturing facility 100 and products flow out of parcel unit 110 through docks in the upper wall of manufacturing facility 100. Docks for outgoing items and docks for incoming material are thus distributed along the perimeter of the manufacturing facility according to a particular pattern that provides for increased material input and shipping output. Carriers face less traffic congestion when traveling to and positioning themselves at incoming and outgoing docks. A greater number of carrier vehicles can therefore be accommodated at one time, compared to prior art facilities. This improvement helps make it possible for the manufacturer support increased production levels and to provide customers with products in a timely manner while utilizing the just-in-time approach to procuring material. Further, the logistical advantages are provided with requiring an increase in the amount of space required to house manufacturing facility 100. The positioning of the docks also minimizes the amount of material movement required within manufacturing facility 100 and, in conjunction with the internal layout, provides for a work flow that is conducive to rapid production and space efficiency.

When an order is released, if products for that order are stored in ASRS 108, the shipping system will preferably automatically discharge those products from ASRS 108 (i.e., direct ASRS 108 to move the products from internal storage to distribution conveyor 116). After the order is released, shipping labels are also applied to the ordered products. Specifically, products from ASRS 108 and products coming directly from the external product docks and directly from assembly unit 101 are all transported through labeling stations (not expressly shown) for products on the way to LTL unit 109 or parcel unit 110. Moreover, the shipping labels for the assembled products are printed and applied in an area of manufacturing facility 100 that is separate from the area in which labels are printed for and applied to articles. For example, product shipping-label printers may be located in a central region of shipping unit 106, while the article-labeling stations may be located in article staging area 107 of shipping unit 106, adjacent to assembly unit 101.

Figure 2:
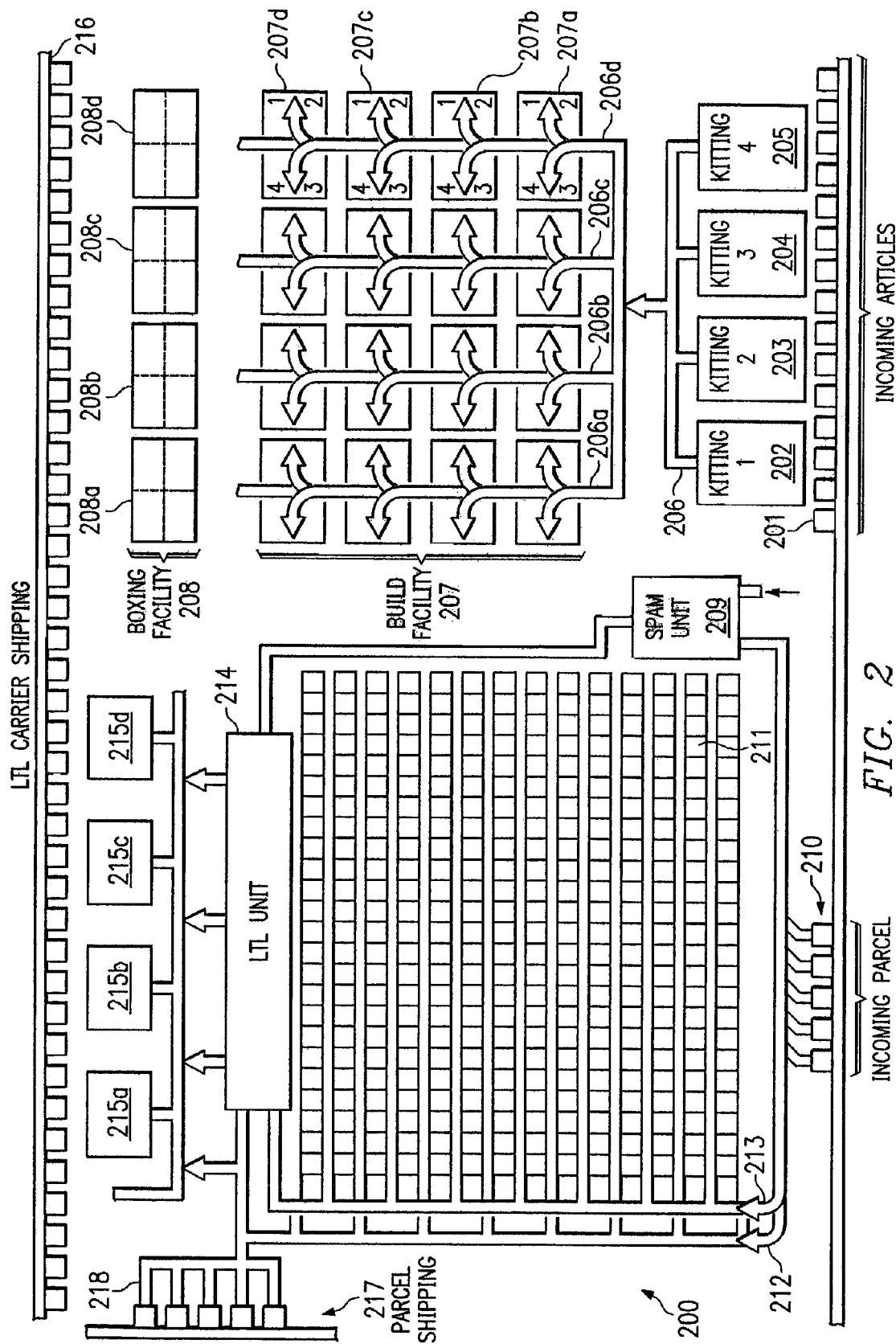
FIG. 2 illustrates a detailed layout of a manufacturing facility in accordance with teachings of the present disclosure.

Referring now to FIG. 2, a detailed illustration of a manufacturing facility is shown. The manufacturing facility illustrated in FIG. 2 is similar to manufacturing facility 100 of FIG. 1 and includes hardware and software for providing a control center for controlling allocation of resources within the manufacturing facility. A manufacturing facility, illustrated generally at 200, includes an incoming articles area 201 for receiving articles, components, etc. for assembling computer systems. Incoming components are staged for assembly within one of a plurality of kitting units 202, 203, 204, and 205. Operators within each kitting unit place associated hardware within a bin (not expressly shown) which is forwarded to a build facility 207 for assembling the components into computer systems. Product is automatically transported to one of the production lines 206a, 206b, 206c, 206d, via transport 206. Build facility 207 includes build area 207a, 207b, 207c, 207d and are associated with each production line 206a, 206b, 206c, 206d. Each build area includes four associated work cells providing operators facilities and equipment for assembling computer systems using the components within each transported kit.

Each transport for an associated production line 206a, 206b, 206c, and 206d is a multi-tiered transport system that includes several vertically displaced transport levels for transporting assembly kits to associated build cells within build facility 207. Each transport is distributively coupled to boxing facility 208 including plural boxing areas 208a, 208b, 208c and 208d for packaging assembled systems for shipping. Upon packaging the assembled products, each box is preferably transferred to shipping where associated items from SPAM (speaker, printer, advanced port replicators, monitors) unit 209 may be joined via a transport system (not expressly shown). Within SPAM unit 209, additional hardware such as speakers, printers, monitors, etc. are included with each packaged product.

Packaged products may be transported to either LTL unit 214, parcel shipping 217 or ASRS 211 depending on an order fill requirement or criteria for the associated produced product. For example, if an order has been filled and is to be shipped via an available LTL carrier, the completed product will be forwarded to one of the pallet areas 215a, 215b, 215c, or 216d for palletizing and subsequent shipping via an LTL carrier. In another embodiment, an order may be forwarded to parcel shipping area 217 for shipping orders to customers which may not require LTL carrier type transportation of product.

ASRS 211 provides temporary storage for assembled products until orders are filled for shipping and an order shipping criteria is met. ASRS 211 distributes products among several rows of shelves vertically displaced within ASRS 211 using first and second ASRS transports 212, 213 and a handler displaced within each row of ASRS 211. Each handler selectively places and removes packaged products within ASRS 211 based on shipping criteria and/or order fulfillment criteria for each stored/retrieved package. Each handler stores and retrieves packages based on the order fulfillment criteria and receives or places the packages on ASRS transports 212 and 213 accordingly. The products are then forwarded to LTL Unit 214 or parcel shipping 217 where the order is delivered to an appropriate customer.

In one embodiment, one or more products may be transferred from another facility to fill an order. For example, a product may be received via incoming parcel 210 and transferred to one of the units within manufacturing facility 200. Incoming parcel 210 may provide a completed product which may be stored within ASRS 211 until an order is complete or used to fill an order for shipping directly to a customer via LTL unit 214. As such, a package received via incoming parcel 210 may be automatically transferred to LTL unit 214, parcel shipping 217, or ASRS 211 based on an order fulfillment criteria for the completed product.

Similar to FIG. 1, each area within the manufacturing facility 200 includes a work-in-process (WIP) profile for each area. For example, boxing facility 208 may include a volume of products in the process of being boxed or staged to be boxed. Boxing facility includes a WIP profile having a capacity and throughput level for each boxing area 208a, 208b, 208c, 208d based on the number of products within and processed through each area. As such, a granular WIP profile may be acquired for each area within boxing facility 208.

In a preferred embodiment, real-time acquisition of WIP profiles advantageously allow a control center for manufacturing facility 200 with access to information relating to the dynamically changing environment within manufacturing facility 200. For example, one or more pieces of equipment within boxing facility 208 may malfunction during operation and may be inoperable for a undeterminable time period. As such, a WIP profile for boxing area 208 may be accessed to determine the maximum throughput of boxing facility 208, and resources within build facility 207 and kitting 206 may be reallocated without overburdening boxing 208 and causing a bottleneck during production. In a similar manner, if one or more pieces of equipment malfunction in boxing area 208a, the control center may automatically re-route product from build facility 202 to boxing area 208b, 208c and/or 208d.

In one embodiment, WIP profiles for each area within manufacturing facility 200 may be used to pull product through manufacturing facility based on the availability of a carrier or available capacity for an incoming carrier. For example, an LTL carrier may schedule shipment of orders using the WIP profiles of production areas within manufacturing facility 200. Such product may be pulled through appropriate areas based on the scheduled availability of the carrier thereby increasing the overall flow of product through the manufacturing facility and subsequently to a carrier. In this manner, portions of an order may be stored throughout manufacturing facility 200 until a carrier is available to transport the product to a customer, thereby increasing the relative throughput of products through manufacturing facility 200 while minimizing inventory of products. Additionally, resources may be dynamically allocated to fill the order in real-time based on WIP profiles within manufacturing facility 200.

Figure 3:
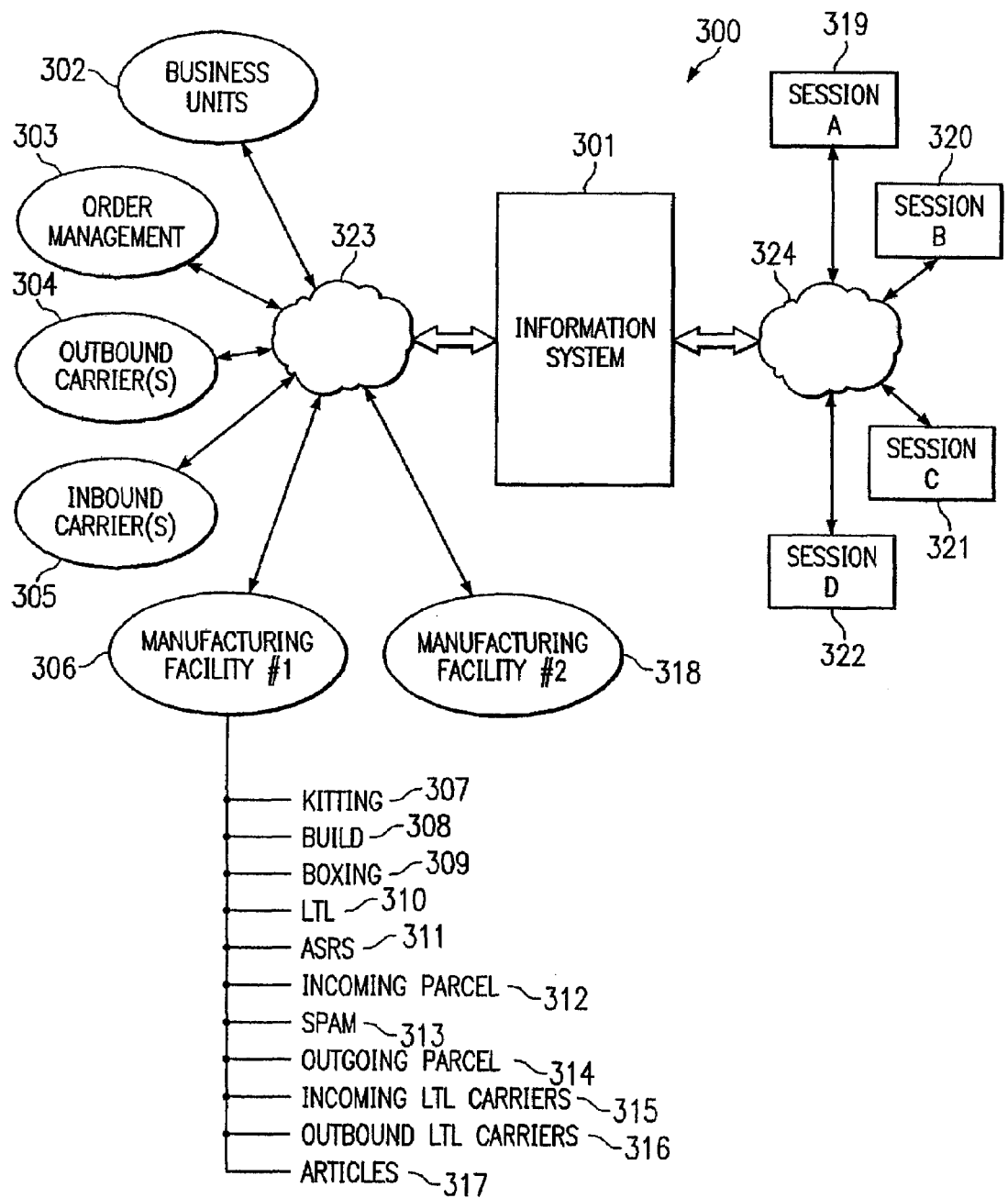
FIG. 3 illustrates a centralized information system for use with a manufacturing facility in accordance with teachings of the present disclosure.

FIG. 3 illustrates a centralized information system for controlling allocation of resources within a manufacturing facility. A control center, illustrated generally at 300, includes an information system 301 that may include even more computer systems, servers, terminals, etc. communicatively coupled to one or more of business units 302, an order management source 303, an outbound carrier(s) source 304, an inbound carrier(s) source 305, a first manufacturing facility 306 and/or second manufacturing facility 318. Each manufacturing facility may include access to several production areas within each facility for producing products such as computer systems. For example, first manufacturing facility 306 may include a kitting area 307, a build area 308, a boxing area 309, an LTL area 310, an ASRS area 311, an incoming parcel area 312, a SPAM area 313, an outbound parcel 314, an incoming LTL carriers 315, outbound LTL carriers 316, and an articles area 317.

Control center 300 advantageously provides access to each information source through aggregating selective information 323 and communicating the selective information via interface 324 to create one or more sessions for efficiently managing production within a manufacturing facility. For example, a session A 319 may include a user interface for monitoring WIP profiles within a manufacturing facility and allocating resources based on WIP profiles for each area. Session B 320 may be used to access information relating to production and dock door scheduling. Session C 321 may be used for identifying and tracking equipment errors for equipment within each part of the facility. Additionally, Session D 322 may include a user interface for identifying and recovering from process errors that may occur within the manufacturing facility. Though illustrated as separate sessions, each session may be integrated with each other or may be provided within separate user interfaces using separate monitors centrally localized to create a control center for managing a manufacturing facility.

Through aggregating information for one or more sources, either internal or external to a manufacturing facility, dynamic allocation of resources within the manufacturing facility can be managed using centralized information system 301. For example, manufacturing facility 306 may include a WIP profile for ASRS area 311 which includes information relating to products stored within ASRS 311 for filling an order managed by order management source 303. As such, order management source 303 may determine when an order ship criteria has been fulfilled using the WIP profile associated with ASRS 311 and release an order upon an inbound carrier being available. In this manner, centralized information system 301 may provide a user interface for a user within a session such as session A 319 allowing a user to make decisions for allocating resources to ship products.

In another embodiment, one or more business units 302 may request orders based on a WIP profile for one or more areas within first and/or second manufacturing facility 306, 318. For example, incoming parcel 312 may include several products shipped from second manufacturing facility 318 to first manufacturing facility 306. One of the business units 302 may request additional products for an order and incoming parcel 312 may receive one or more of the requested products. As such, centralized information system 301 may aggregate information relating to the request and provide a user of system 301 WIP profile and scheduling information for filling the updated order. In this manner, resources for producing, scheduling, storing, transporting, etc. for a manufacturing facility may be dynamically allocated to fill each order based on WIP profiles associated with portions of the manufacturing facility.

In another embodiment, information system 301 may be used to identify process errors occurring within a manufacturing facility allowing a user of system 301 to re-allocate resources and expedite resolving issues for the problematic process. For example, a burn-in process may be causing errors for a particular product and not for another product being manufactured. As such, the problematic process may be identified by information system 301 and a user interface may be updated to identify the problem in real-time. As such, a user of control center 300 may re-route products and/or resources to another portion of the manufacturing facility to minimize the impact on production caused by the burn-in process.

Figure 4:
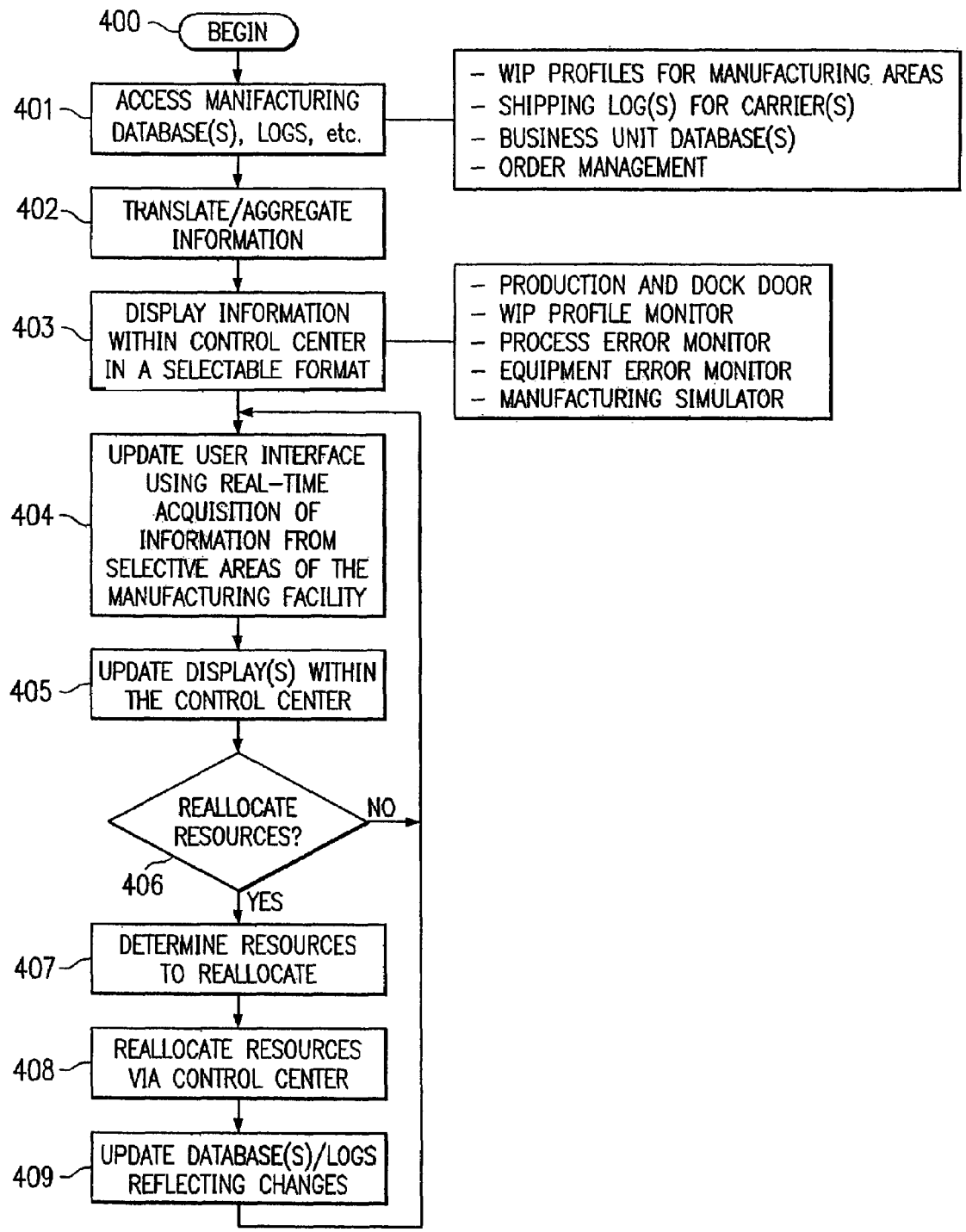
FIG. 4 illustrates a flow diagram of a method for managing resources within a manufacturing facility.

FIG. 4 illustrates a flow diagram of a method for managing resources within a manufacturing facility. The method begins generally at step 400. At step 401, the method accesses one or more databases associate with manufacturing products and translates 402 information representative of a real-time manufacturing environment into a user interface 403 displayable within a monitor located within a control center for the manufacturing facility. One or more user interfaces may be displayed on one or more monitors within the control center and may include a production and dock door scheduling user interface, a WIP profile and resource allocation user interface, a process error and recovery user interface, an equipment error identification and recovery user interface, a simulation user interface, or other user interfaces which may be centrally located with a control center.

Upon displaying a user interface, the method proceeds to provide real-time updates 404 for each user interface 405 through accessing one or more networks operable to provide real-time updates to data logs or databases representing changes within the manufacturing environment. For example, a problem may occur with one or more products for an order which was produced in a particular build cell of the manufacturing facility. However, several other products for the same order may not encounter such quality issues. As such, the satisfactory products may be packaged and forwarded to ASRS and stored while the products with problem(s) are held until the problem is resolved. Such a situation may provide a challenge for resources which have been allocated for filling an order. For example, a particular LTL carrier may have been scheduled to ship the completed order to a destination. With a portion of the order being held, the LTL carrier may not be able to meet the deadline. The method would determine if resources should be reallocated 407 and allow a user to access one or more areas having WIP profiles for similar product within the manufacturing facility and reallocate resources 408 within the facility so that the LTL carrier will not have to wait and the deadline will be met. The change in resource allocation may be updated within an appropriate database 409 and the method would update the user interface 404 accordingly.

In another embodiment, an LTL carrier which may be incoming to the manufacturing facility may have additional space for transporting products. As such, the control center may be able to access orders and resources 407 associated with products being manufactured within the manufacturing facility and pull product based on WIP to fill an order for the carrier thereby making efficient use of the additional space within the particular carrier and resources and/or product within the manufacturing facility.

Figure 5:
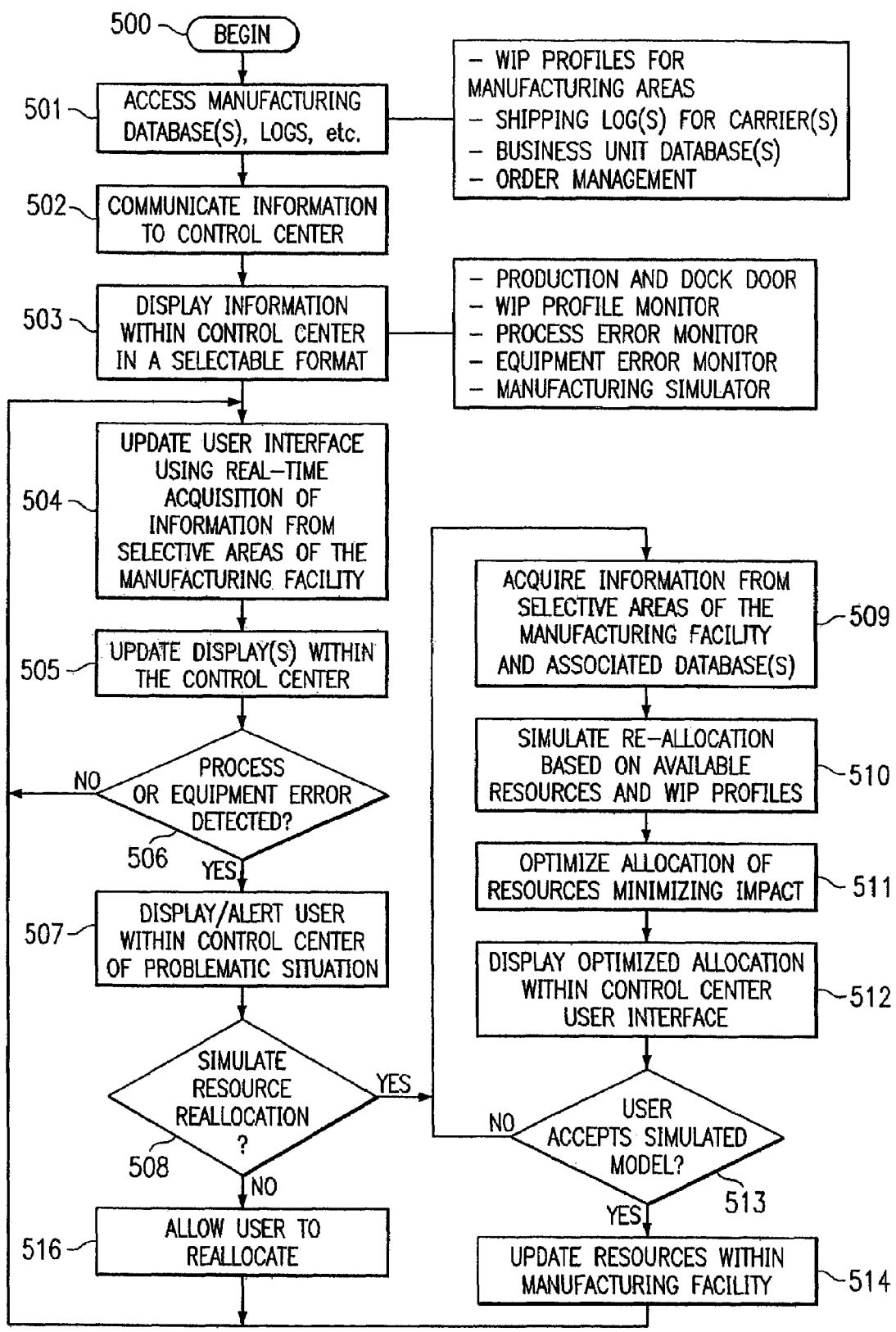
FIG. 5 illustrates a flow diagram of a method for allocating resources using a remote monitor and simulator in accordance with teachings of the present disclosure.

FIG. 5 illustrates a flow diagram of a method for allocating resources using a remote monitor and simulator. The method begins generally at step 500 and may be used by a product such as the system illustrated in FIG. 3 or other systems operable to employ the method of FIG. 5. Additionally, the method may be embodied within a program of instructions such as a computer readable medium or within other mediums such as encoded logic firmware, or hardware operable to employ the method of FIG. 5.

At step 501 the method accesses one or more databases associated with a manufacturing facility and communicates the information 502 to a control center operable to display a control system 503 including a remote system monitor of resources within a manufacturing facility. In one embodiment, the remote monitoring system includes a graphical illustration of each piece of equipment within the manufacturing facility and an associated status log for the equipment. For example, the user interface may display if a piece of equipment is fully functional or if the equipment is inoperable. Other embodiments may include determining the throughput for a piece of equipment and/or determining an item being processed by a piece of equipment. For example, one or more logs or databases may be maintained for the piece of equipment thereby allowing the remote system to monitor activities associated with each piece of equipment.

Upon updating a user interface using real time acquisition of information 504 and updating a display 505 within the control center, the method proceeds to step 506 where the method detects a process or equipment error. If no errors are detected, the method proceeds to step 504 and repeats. If an error is detected, the method updates the remote monitoring system and alerts users 507 within the control center of the updated status.

For example, a visual indication on a user interface may be displayed and may include sending a page to one or more individuals alerting them of the altered status for the equipment or process. The method then proceeds to step 508 where the method determines if resources should be reallocated. If a simulation is not run, a user may reallocate resources 516 within the manufacturing facility. If a simulation of resource allocation is selected, the method proceeds to step 509 where information within selective areas of the manufacturing facility are acquired. For example, the method may determine availability of resources within another portion of the factory by accessing a WIP profile for each area within the factory. The simulator may then take the current volume scheduled for the inoperable section of the factory and schedule all or portions of the work load to one or more areas within the factory. For example, a particular area may have the capacity to output additional units prior to reaching full capacity. As such, the simulator may determine the available capacity for one or more areas within the factory and simulate routing portions or all of the workload to the available resources 510. The simulator may attempt several iterations 511 until an optimized re-allocation of resources is determined and display the results 512 within a user interface of the control center. Upon determining an optimized model, a user within the control center may accept or decline the simulation 513 and the method proceeds to step 514 where the method updates and deploys the determined scenario.

For example, if piece of equipment within one of the build cells 207a of FIG. 2 became inoperable and rendered build cell 207a inoperable, the method may determine that a build cell within another portion of build facility 207 may be able to handle the workload. As such, the control center may re-route kits coming from one or more kitting facilitates using transport 206 until the problem with build cell 207a is resolved. In this manner, real-time access to resources within the manufacturing facility may be accessed via a remote monitoring system and a simulation may determine allocating available resources within the manufacturing facility thereby allowing dynamic allocation of resources based on a current WIP profiles associated with each area within the manufacturing facility.

Figure 6:
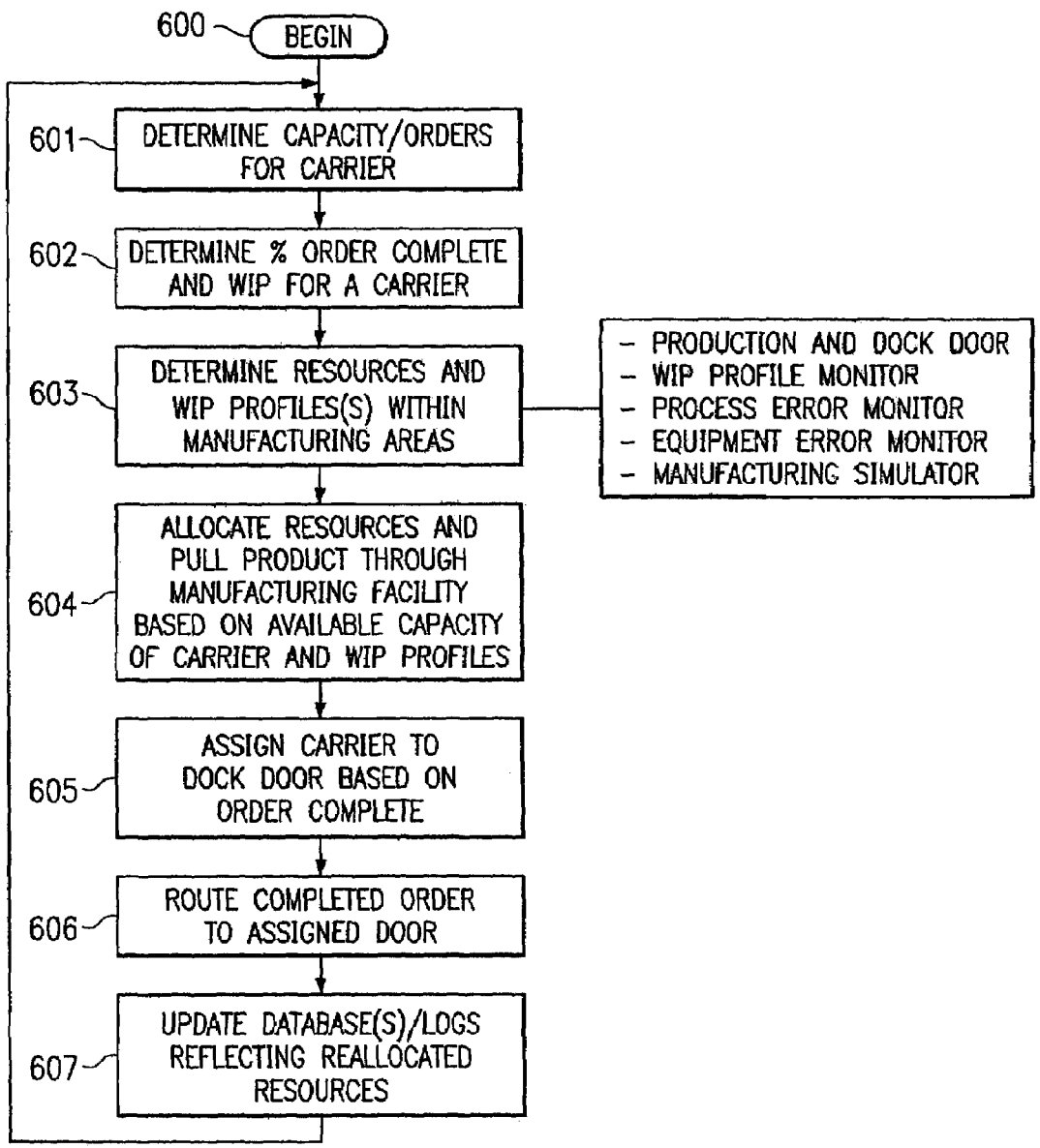
FIG. 6 illustrates a flow diagram of a method for pulling product through a manufacturing facility based on capacity availability of a carrier and WIP profiles of the manufacturing facility in accordance with teachings of the present disclosure.

Referring now to FIG. 6, a flow diagram of a method for pulling product through a manufacturing facility based on capacity availability of a carrier and WIP profiles of the manufacturing facility is shown. The method begins generally at step 600. At step 601, a control center may be used to determine capacity and/or orders for a carrier 601 that may be inbound or proximal to a manufacturing facility. For example, a carrier may include additional capacity to ship products to a destination. Upon determining a carrier, a percent completion for an order for the carrier is determined 602 and resources for the order including WIP profiles and order fulfillment of products are also determined 603. The method then proceeds to step 604 where resources for the shipment are allocated in order to fulfill a ship criteria and the carrier is assigned to a dock door 605. The method then proceeds to step 606 where completed products may be retrieved from an ASRS and joined with other products that may be pulled through the manufacturing facility based on current levels of production within the manufacturing facility. Each product may be merged with other products being manufactured and/or retrieved from other locations within the facility and palletized if appropriate and routed to the assigned door for the carrier 606. The method then proceeds to step 607 where one or more database(s), logs, etc. may be updated to reflect the resources being allocated to fill the order. The method then repeats at step 601.

Although the disclosed embodiments have been described in detail, it should be understood that various changes, substitutions and alterations can be made to the embodiments without departing from their spirit and scope.

What is claimed is:

1. A method of managing resources in a build-to-order manufacturing facility, the method comprising:
   automatically maintaining a work-in-process (WIP) profile for an area in a manufacturing facility, based on scans of each product unit entering the area and each product unit leaving the area;
   maintaining order management information for product in the area;
   automatically updating a display device in a control center for the manufacturing facility to depict the total amount of product in the area in substantially real time, based on the WIP profile;
   after updating the display device in the control center to depict the total amount of product in the area, receiving user input that specifies a desired dynamic reallocation of resources for the manufacturing facility based upon the WIP profile and the order management information; and
   in response to receiving the user input that specifies a desired dynamic reallocation of resources, automatically communicating with the area in the manufacturing facility to implement the desired reallocation of resources.

2. A method according to claim 1 further comprising determining a total amount of product in the area by aggregating information on individual product units.

3. A method according to claim 1 further comprising:
   monitoring pieces of equipment in the manufacturing facility for equipment errors; and
   in response to detecting an equipment error, automatically updating the display device in the control center to depict the detected error in substantially real time.

4. A method according to claim 3 further comprising:
   after updating the display device in the control center to depict the detected error, receiving user input that specifies a second reallocation of resources for the manufacturing facility; and
   in response to receiving the user input, automatically communicating with one or more areas in the manufacturing facility to implement the second reallocation of resources.

5. A method according to claim 1 further comprising, following implementing the desired reallocation of resources, updating the WIP profile to reflect the reallocation or resources.

6. A method according to claim 1 wherein the control center display device further depicts at least one information field selected from the group consisting of production and dock door product information, a process error, an equipment error and a manufacturing error.

7. A method according to claim 1 further comprising maintaining at least one shipping unit data base.

8. A method according to claim 1 further comprising maintaining at least one shipping log for at least one carrier.

9. A method according to claim 1 further comprising maintaining a plurality of shipping logs for a plurality of carriers.

10. A method according to claim 1 further comprising, after receiving user input that specifies a desired dynamic reallocation of resources, simulating the desired reallocation.

11. A method according to claim 10 further comprising, in response to the simulation of the desired reallocation, performing a subsequent simulation of a second desired reallocation.

12. A method of managing resources in a build-to-order manufacturing facility, the method comprising:
    monitoring work-in-process (WIP) profiles based on information acquisition from selected areas of manufacturing facility;
    automatically updating a user interface in a control center for the manufacturing facility to depict WIP profiles;
    determining available shipping capacity based on shipping and scheduling information for a carrier that serves the manufacturing facility;
    determining at least one order available for shipping based on the WIP profiles; and
    assigning the carrier to a dock associated with the manufacturing facility based upon the at least one available order and available shipping capacity of the carrier.

13. A method according to claim 12 wherein assigning the carrier is based upon a determination of a completion percentage of an order based upon one or more WIP profiles.

14. A method according to claim 12 further comprising:
    monitoring pieces of equipment in the manufacturing facility for equipment errors; and in response to detecting an equipment error, automatically updating the display device in the control center to depict the detected equipment error in substantially real time.

15. A method according to claim 12 further comprising:
monitoring the manufacturing facility for processing errors; and
in response to detecting an equipment error, automatically updating the display device in the control center to depict the detected processing error in substantially real time.

16. A program product for managing resources in a build-to-order manufacturing facility, the program product comprising:
a computer-usable medium;
computer instructions encoded in the computer-usable medium, wherein the computer instructions, when executed, perform operations comprising:
monitoring work-in-process (WIP) profiles that represent the total amount of product in different areas in a manufacturing facility;
maintaining order management information for the product in the area;
automatically updating a user interface in a control center for the manufacturing facility to depict the total amount of product in the different areas of the manufacturing facility based on one or more of the WIP profiles;
after updating the user interface in the control center to depict the total amount of product in the different areas in substantially real time, receiving user input that specifies a desired reallocation of resources for one or more of the different areas in the manufacturing facility based upon the WIP profile and the order management information; and
in response to receiving the user input, automatically communicating with one or more of the different areas in the manufacturing facility to implement the desired reallocation of resources.

17. A program product according to claim 16 wherein the computer instructions further generate a production and dock door scheduling user interface in the control center to facilitate dynamic monitoring and allocation of resources for the manufacturing facility.

18. A program product according to claim 16 wherein the computer instructions further generate a process error and recovery user interface in the control center to facilitate dynamic monitoring and allocation of resources for the manufacturing facility in response to a detected process error.

19. A program product according to claim 16 wherein the computer instructions further generate an equipment error identification and recovery user interface in the control center to facilitate dynamic monitoring and allocation of resources for the manufacturing facility.

20. A program product according to claim 16 wherein the computer instructions further update the WIP profiles to reflect the reallocation of resources.

* * * * *